Jan. 21, 1969  W. E. HYDE ET AL  3,422,900
PRESSURE ASSISTED RETRIEVABLE BRIDGE PLUG
Filed Dec. 30, 1966  Sheet 1 of 6
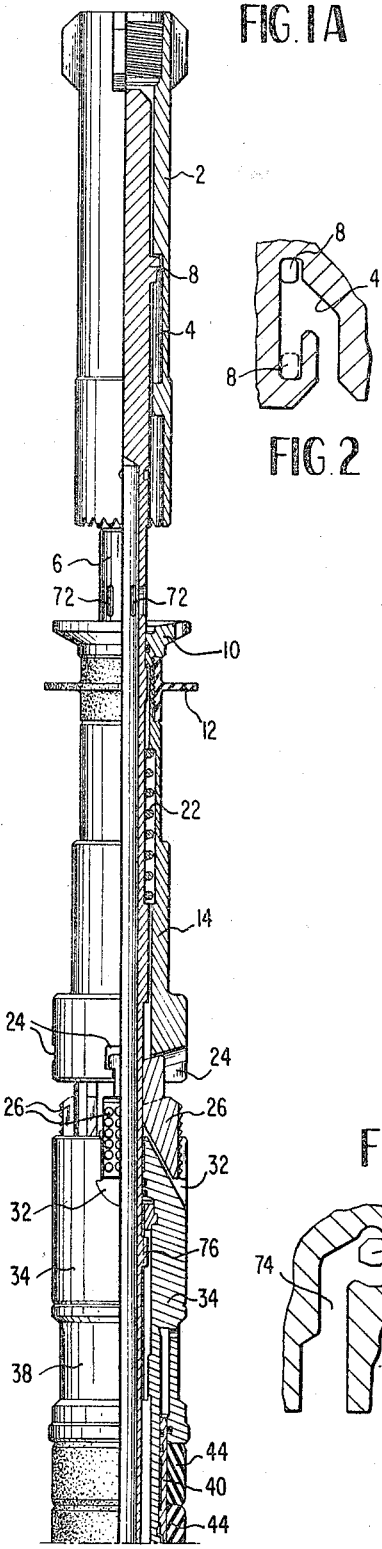
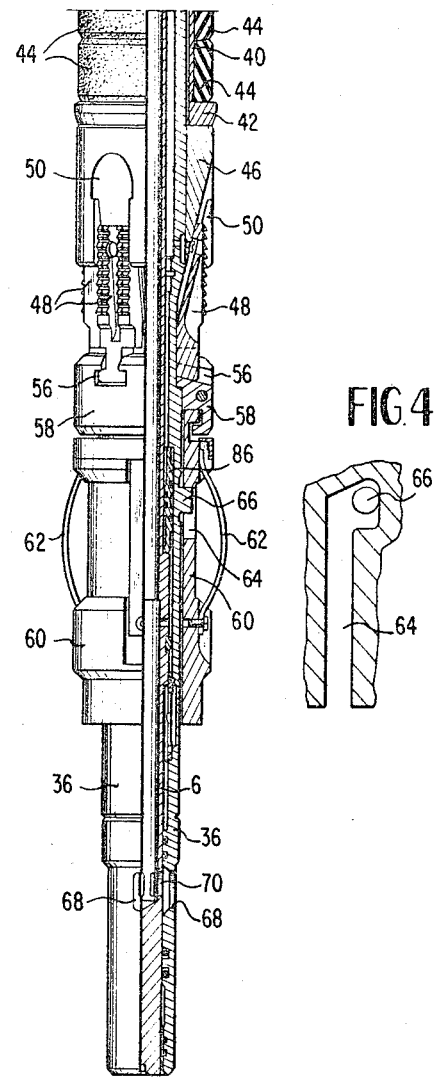
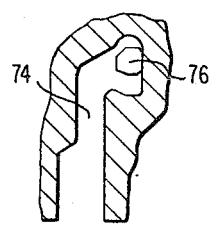
INVENTORS
WALTER E. HYDE
DAVID L. FARLEY
JOHN C. HOLDEN
BY
ATTORNEY

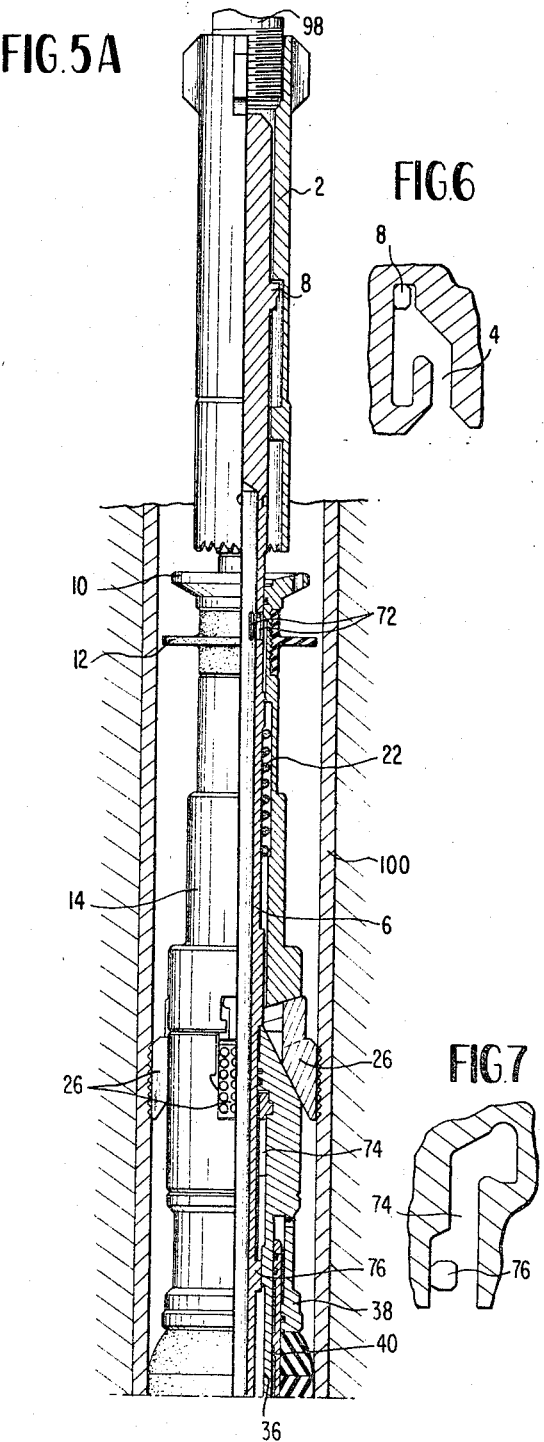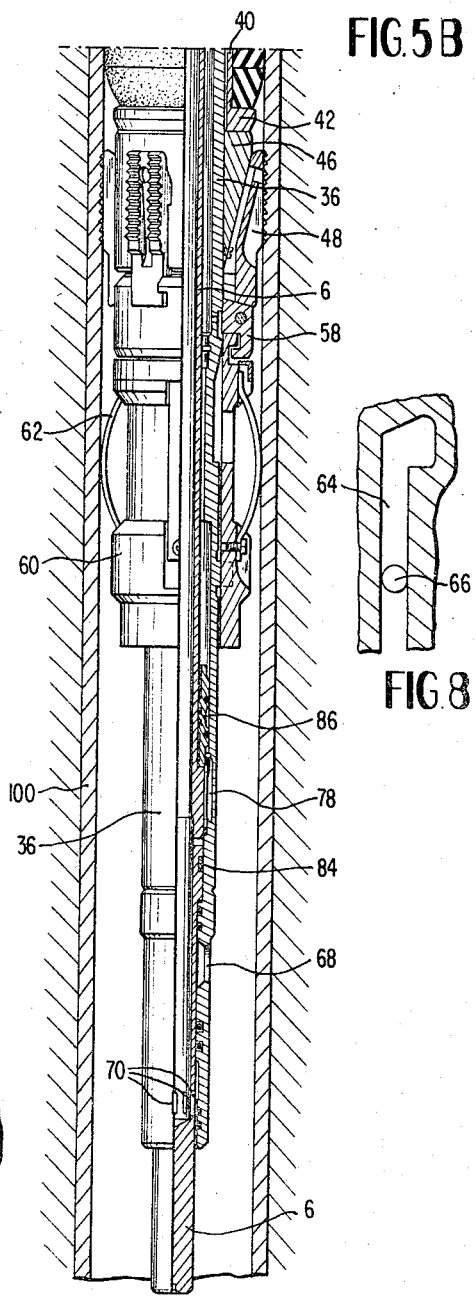

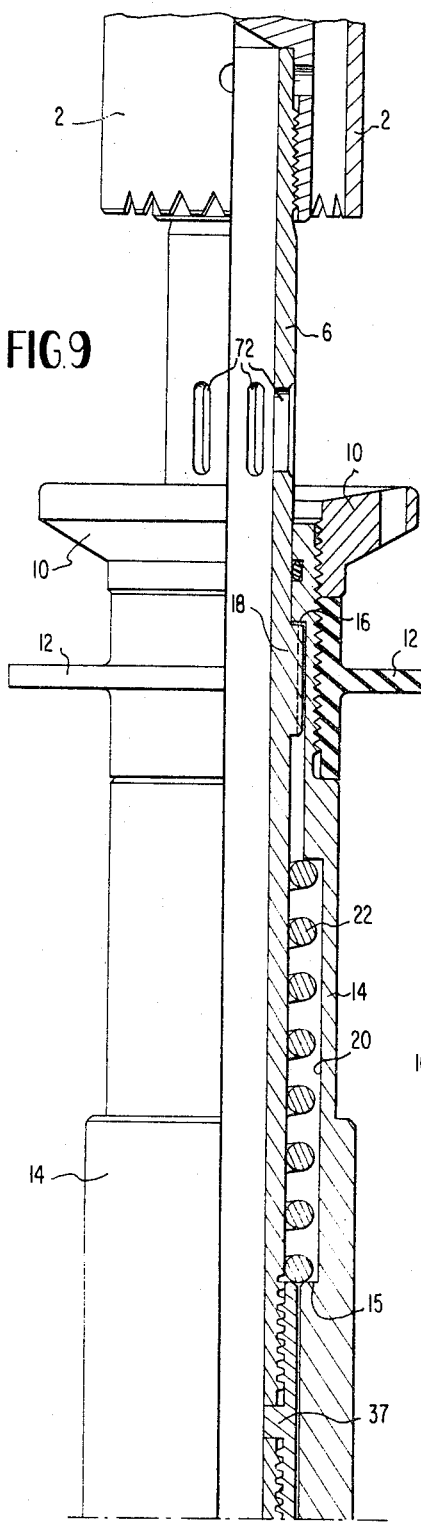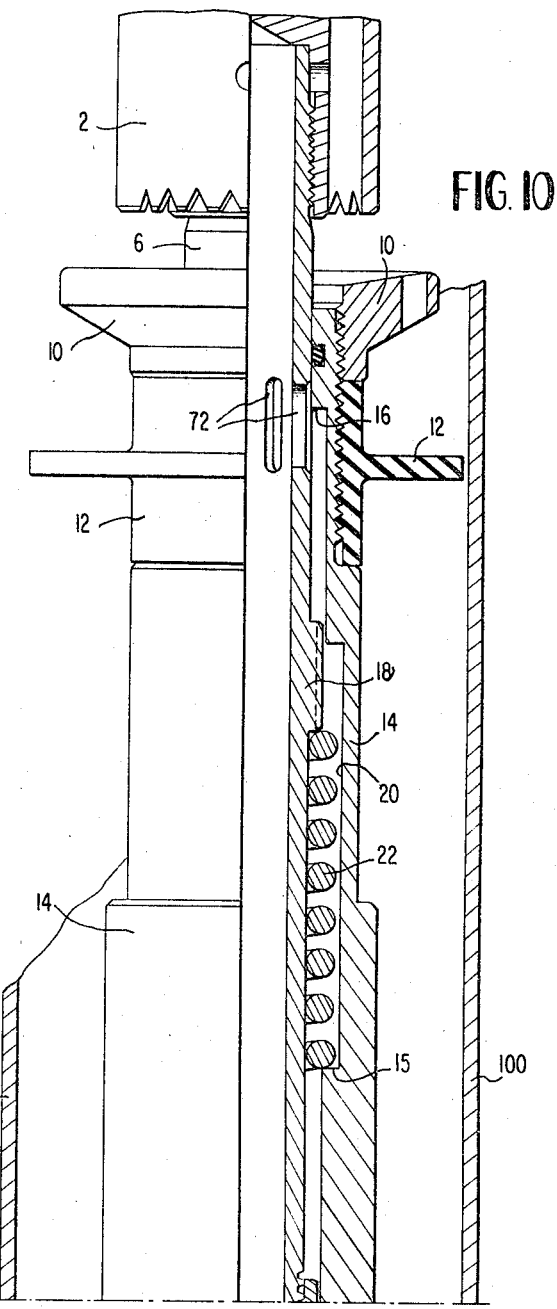

FIG.11
FIG.12
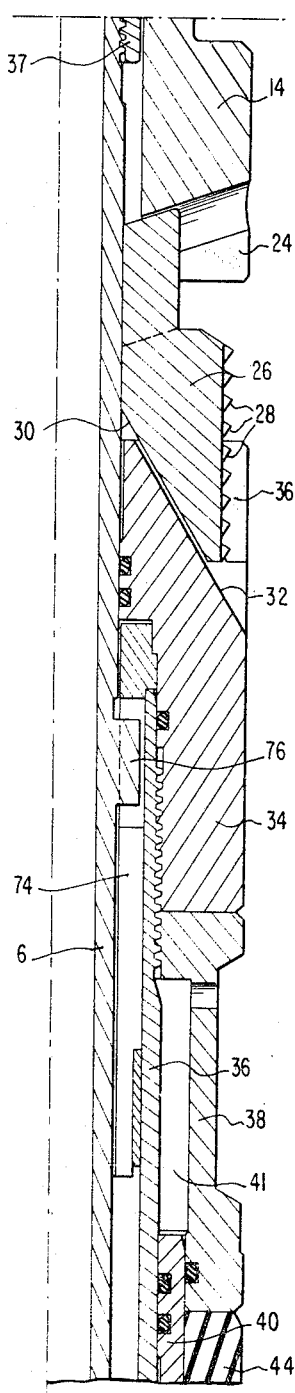
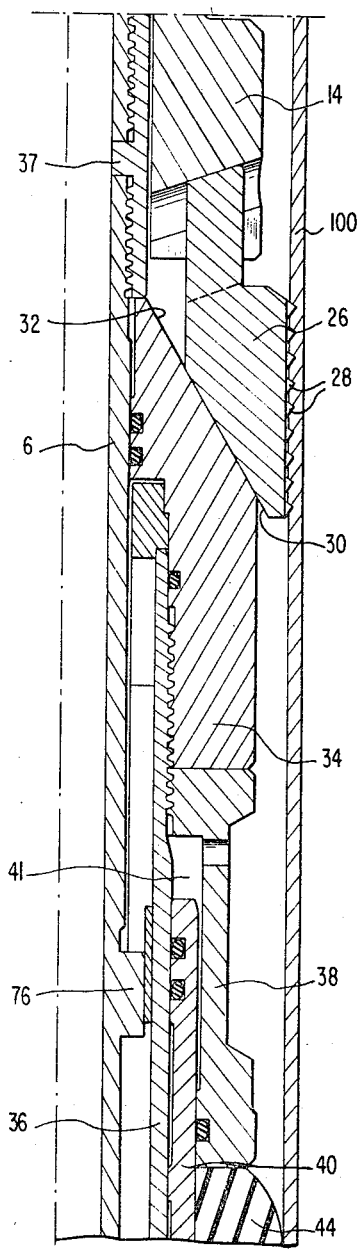
INVENTORS
WALTER E. HYDE
DAVID L. FARLEY
JOHN C. HOLDEN
BY
ATTORNEY

INVENTORS
WALTER E. HYDE
DAVID L. FARLEY
JOHN C. HOLDEN

BY Burns, Doane, Benedict, Swecker & Mathis

ATTORNEY

United States Patent Office 3,422,900
Patented Jan. 21, 1969

3,422,900
**PRESSURE ASSISTED RETRIEVABLE
BRIDGE PLUG**
Walter E. Hyde, David L. Farley, and John C. Holden,
Duncan Okla., assignors to Halliburton Company, Duncan, Okla., a corporation of Delaware
Filed Dec. 30, 1966, Ser. No. 606,413
U.S. Cl. 166—131                    16 Claims
Int. Cl. E21b 23/00, 33/12

ABSTRACT OF THE DISCLOSURE

A retrievable bridge plug with a spring interposed between the control mandrel and the slips on one side of the packer rings. The packer setting force is applied by one shoulder on the mandrel, while the slip setting force is applied to the slips through the spring, thus dividing the setting force between the slips and the packer ring. The control mandrel is designed in such a way that differential pressure is utilized to keep the equalizing valve closed and the bridge plug in the set position without the aid of a positive mechanical lock which would require tubing rotation in order to unlock it. A collet spring arrangement in the tool provides an indication at the surface that longitudinal displacement of the control mandrel has occurred. The collet spring arrangement in the tool also provides a temporary resistance to the upward movement of the control mandrel which permits an impact to be applied to help release the tool. The bridge plug also is constructed to take advantage of the pressure differential existing across the packer rings to compress the packer rings more tightly against the casing.

Background of the invention

This invention relates to well apparatus, and more particularly to retrievable bridge plugs.

A bridge plug is lowered in a cased hole on the lower end of a tubing string. At the desired depth, the tool is actuated to expand a packer element outwardly in sealing relation with the casing to prevent the flow of fluid vertically through the annular space between the tool and the casing. One type of bridge plug utilizes slips above and below the packer element which bite into the well casing to prevent the packer element from collapsing. These slips are set by displacing either the lower or upper set of slips outwardly into engagement with the well casing, and then displacing the other slips outwardly against the casing by applying a force in the direction of the first set of slips. The packer element is positioned between the upper and lower slips and, since the first slips bite into the casing, they are locked against movement away from the packer ring. The other slips slide along the casing until sufficient radial expansion of the ring has occurred to form a tight seal against the casing.

In bridge plugs of this type, the entire weight of the tubing string is applied through the slips to the packer element. Consequently, only a portion of the setting force acts on the packer rings to cause radial expansion of the rings and often a very large setting force is required to expand the packing rings.

Another difficulty with conventional bridge plugs of this type is that leakage may occur between the packer ring and the casing when pressure is applied from below the tool. This is because the packer ring does not have a continuing mechanical "squeeze" against it as the pressure begins to extrude the rubber into the clearance between the casing and the bridge plug.

In manipulating the bridge plug by setting down weight, lifting and turning the tubing string, it is always desirable to have some positive indication that the intended operation in the bridge plug has taken place. This is needed so the operator knows when the bridge plug is set and when it is released. Also it is desirable to have sufficient mechanical energy available at the bridge plug in order to release the tool without imparting excessive stress in the tubing string.

Accordingly, it is an object of this invention to provide an improved retrievable bridge plug.

It is a further object of this invention to provide a bridge plug in which the axial setting force is applied directly to the packer rings.

It is a still further object of this invention to provide improved means for applying axial force to the packer rings in response to a pressure differential across the packer rings.

Another object of this invention is to provide a bridge plug with a control mandrel that indicates positively whether the bridge plug is set or released.

Another object of this invention is to provide a bridge plug which does not require any rotation of the tubing in order to release and retrieve the tool.

Another object of this invention is to provide a bridge plug with a temporary resistance that permits a jarring action to be employed to help release the tool.

Summary of the invention

These objects are accomplished in accordance with the preferred embodiment of the invention by a retrievable bridge plug having a control mandrel and a packer mandrel mounted coaxially on said control mandrel. A packer ring is mounted on the packer mandrel between upper and lower mechanical slip bodies. The upper slip body is secured to the packer mandrel, while the lower slip body is movable axially relative to the packer mandrel, so that as the axial distance between the upper and lower slip bodies decreases, the packer ring is squeezed outwardly into sealing engagement with the casing. The upper slips are supported in a slip retainer sleeve, and cam means between the slips and the upper slip body cause the slips to be displaced outwardly upon longitudinal movement of the retaining sleeve toward the packer ring.

The upper slip retaining sleeve and the slip body, each has an upwardly facing shoulder and the control mandrel has corresponding shoulders in position to engage the sleeve shoulder and the slip body shoulder. An axially compressible spring is interposed between the slip retaining sleeve shoulder and the control mandrel shoulder. This arrangement permits one of the control mandrel shoulders to engage the mechanical slip body directly, while an axial force exerted by the control mandrel is transmitted through the spring to the upper slip retainer sleeve. Most of the axial force is imposed on the mechanical slip body causing expansion of the packer ring, while sufficient axial force is applied to the slip retainer sleeve to cause the slips to be displaced outwardly against the casing.

Another feature of the retrievable bridge plug of this invention is the means to impart a downward force on the control mandrel resulting from a pressure differential regardless as to direction from above or below. This feature eliminates the necessity of a mechanical lock would require rotation in order to release it. A floating piston is provided between the packer mandrel and the control mandrel, and a port in the control mandrel communicates with an annular space on the outside of the packer mandrel and below the packer ring. The piston is located below the port and is movable into engagement with an upwardly facing shoulder on the control mandrel. Thus, when the pressure below the packer ring exceeds the pressure above the packer ring, the pressure differential is applied through the piston to the control mandrel in a downward direction. The area of the piston is greater than the area exposed to pressure differential at the bottom of the control mandrel; therefore, the net result is a downward force which keeps the control mandrel down. Since the piston is a floating type, when a pressure differential is applied from above the bridge plug the piston does not create an upward force on the control mandrel because this force is transmitted to the packer mandrel which in turn is anchored in place by the upper slips. Therefore the force caused by pressure acting down on the bottom of the control mandrel keeps the control mandrel in the downward position. Consequently, pressure acting from either direction will create a resulting force in a downward direction on the control mandrel which maintains the bridge plug in the set position with the equalizing valve closed.

Another feature of the retrievable bridge plug of this invention is the means for increasing the axial force on the packer ring to maintain a mechanical "squeeze" to compensate for movement of the packer ring which may result from a pressure differential across the packer ring. This is called the "pressure assist" feature.

There is also a latch collar on the packer mandrel and a latch ring on the control mandrel to provide a positive indication that the lower slips have been set, and also to serve as a jar to assist in breaking the slips free from the casing, when it is desired to collapse the packer ring. The latch collar and ring also keep the control mandrel down while the overshot is removed from the bridge plug. The retrievable bridge plug of this invention also includes ports above and below the packer ring in order to equalize the pressure on opposite sides of the packer ring before the packer ring is collapsed.

Description of the drawings

This preferred embodment is illustrated in the accompanying drawings in which:

FIG. 1A is a partial cross sectional view of the upper portion of the retrievable bridge plug of this invention prior to being set in a well casing;

FIG. 1B is a partial cross sectional view of the lower portion of the bridge plug as in FIG. 1A;

FIG. 2 is a schematic view of the overshot J-slot;

FIG. 3 is a schematic view of the packer mandrel J-slot;

FIG. 4 is a schematic view of the drag spring sleeve J-slot;

FIG. 5A is a partial cross sectional view of the upper portion of the retrievable bridge plug as set in a well casing;

FIG. 5B is a partial cross sectional view of the lower portion of the bridge plug as set in a well casing;

FIG. 6 is a schematic view of the overshot J-slot as in FIG. 5A;

FIG. 7 is a schematic view of the packer mandrel control J-slot as in FIG. 5A;

FIG. 8 is a schematic view of the drag spring sleeve control J-slot as in FIG. 5B;

FIG. 9 is an enlarged cross sectional view of the upper portion of the bridge plug showing the upper port opened;

FIG. 10 is an enlarged cross sectional view of the portion of the bridge plug as in FIG. 9 after the bridge plug has been set in a well casing;

FIG. 11 is an enlarged cross sectional view of the portion of the bridge plug directly above the packer rings;

FIG. 12 is an enlarged cross sectional view of the portion of the bridge plug as in FIG. 11 after the bridge plug has been set in a well casing;

Description of the preferred embodiment

Figure 13:
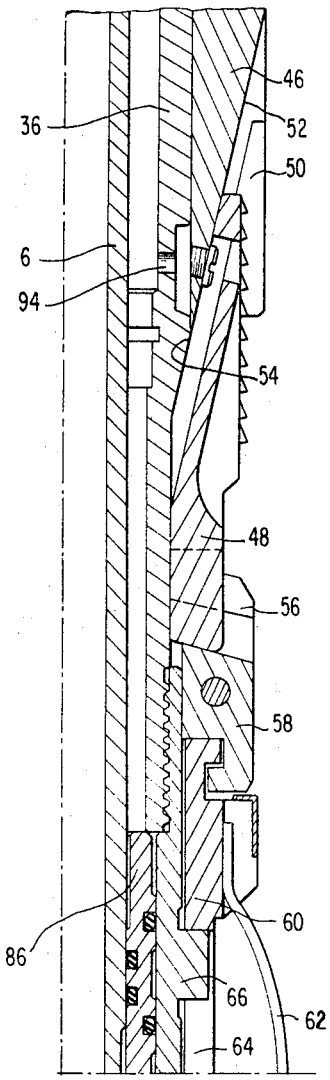
FIG. 13 is an enlarged cross sectional view of the portion of the bridge plug directly below the packer rings.

Referring to FIGS. 1A and 1B, the retrievable bridge plug is adapted to be suspended from the lower end of a tubing string by means of an overshot 2 which is internally threaded at its upper end for coupling to the lower end of the tubing string. The overshot 2 has an internal control J-slot 4 which is shown schematically in FIG. 2. The upper end of a control mandrel 6 is received in the overshot 2 and a lug 8 projecting radially outward from the control mandrel 6 cooperates with the J-slot 4 for controlling the axial and rotational movement of the control mandrel 6 relative to the overshot 2. An upward force may be transmitted to the mandrel 6 when the lug 8 engages the shoulder formed by the lower end of the closed groove in the J-slot 4, as shown in dotted lines in FIG. 2. Similarly, a downward force may be applied when the lug is in the position shown in full lines in FIG. 2. The overshot 2 may be disconnected from the control mandrel 6 by lifting while imparting a right hand rotation to the tubing string to cause the lug 8 to pass out of the open end of the J-slot 4. The tubing string may then be raised, leaving the tool in the casing.

Referring to FIG. 9, a junk catcher 10 and a flexible cup 12 are secured on a sleeve 14 below the overshot 2. For simplicity of illustration, the sleeve 14 is shown as a single integral element, but in actual practice, it is made up of several individual members which are secured together by screw threads or other suitable means. The sleeve 14 is mounted coaxially on the control mandrel 6 and restricted against axial movement relative to the control mandrel by a shoulder 16 which cooperates with a cylindrical collar 18 on the control mandrel. A cylindrical recess 20 is formed in the interior of the sleeve 14 and a coil spring 22 is positioned in the recess 20 between the sleeve 14 and the control mandrel 6. The spring 22 is in position to be engaged by the lower end of the collar 18 when the control mandrel 6 is displaced downwardly relative to the sleeve 14. The lower end of the spring 22 is restricted against movement relative to the sleeve 14 by the shoulder 15 at the lower end of the recess 20.

The lower end of the sleeve 14 has a plurality of T-slots 24, as shown in FIG. 11, and the upper end of a slip 26 is mounted in each of the slots 24. The slips 26 have a plurality of teeth elements 28 on their outer surface, which are inclined to bite into the casing wall upon upward movement of the slips relative to the casing, but the elements 28 are capable of sliding along the casing upon downward movement relative to the casing. The inside surface 30 of each slip 26 is inclined outwardly and bears against a similarly inclined surface 32 on the upper end of an upper slip body 34. The inclined surface 32 is part of a T-slot 36 in which the lower end of each of the slips 26 is mounted.

The control mandrel 6 is also provided with a coupling 37 (FIGS. 9 and 11) which projects outwardly from the surface of the control mandrel. The coupling 37 forms a shoulder at the lower end of the coupling which is in position to engage the upper end of the mechanical slip body 34, upon downward movement of the mandrel 6 relative to the slip body 34.

The upper mechanical slip body 34 is mounted coaxially on the control mandrel 6, and is movable relative to the mandrel 6. As shown in FIG. 11, the mechanical slip body 34 is threadedly secured on a packer mandrel 36. A top shoe 38 is also threadedly mounted on the packer mandrel 36 adjacent the lower end of the body 34. A packer sleeve 40 is mounted in telescoping relation on the packer mandrel 36, and the upper end of the sleeve 40 is received in a cylindrical chamber 41 formed between the top shoe 38 and the mandrel 36. The lower end of the packer sleeve 40 has an outwardly extending flange 42

(FIG. 1B) which cooperates with the lower end of the top shoe 38 for applying axial compression forces to a plurality of packer rings 44, which are mounted on the packer sleeve 40. Preferably, the packer rings 44 are relatively thin, in order to be deformed into sealing engagement with the casing by a relatively low axial force.

Below the packer sleeve flange 42, a lower mechanical slip body 46 is mounted on the packer mandrel 36. The body 46 is movable axially relative to the mandrel 36. The upper end of each of a plurality of lower slips 48 is received in a T-slot 50 having an inclined lower surface 52 which cooperates with a corresponding inclined surface 54 on the slips 48 to cam the slips outwardly upon longitudinal movement of the slips upwardly relative to the body 46. The lower end of each slip 48 is mounted in a T-slot 56 in a lower slip retainer collar 58. The collar 58 is secured to the upper end of a drag sleeve 60, and a plurality of conventional drag springs 62 are mounted on the exterior of the sleeve 60.

Figure 15:
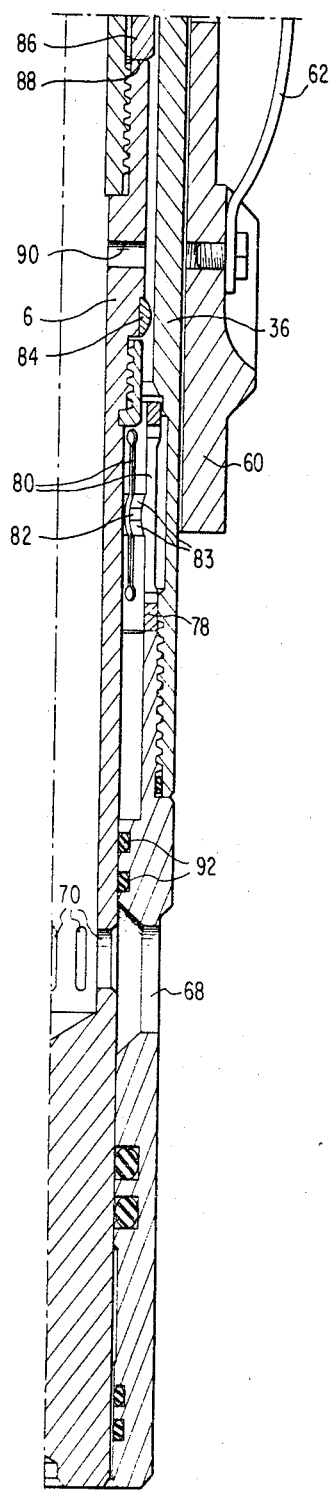
FIG. 15 is an enlarged cross sectional view of the lower portion of the bridge plug showing the latch collar and latch ring.

The packer mandrel 36 extends through the drag spring sleeve 60 and movement of the packer mandrel relative to the sleeve 60 is controlled by a J-slot 64 in the sleeve 60 which cooperates with a lug 66 on the packer mandrel 36. The J-slot 64 prevents relative axial movement of the sleeve 60 and mandrel 36 when the mandrel lug 66 is in the position shown in FIG. 4. However, when the packer mandrel 36 is rotated relative to the sleeve 60, the lug 66 enters the elongated portion of the J-slot 64 and is movable downwardly relative to the sleeve 60. The lower end of the packer mandrel 36 extends below the drag spring sleeve, as shown in FIG. 15, and has a plurality of radial ports 68 which communicate with the interior of the control mandrel 6 through ports 70 when the control mandrel is in the position shown in FIG. 15. Ports 72 (FIG. 9) are also provided at the top of the control mandrel 6 to allow fluid to circulate through the control mandrel, when the mandrel 6 is in the position shown in FIGS. 1A and 1B.

Movement of the control mandrel 6 relative to the packer mandrel 36 is controlled by a J-slot 74 on the interior surface of the packer mandrel (FIG. 11) which cooperates with a lug 76 on the control mandrel 6. As shown in FIG. 3, the J-slot 74 restricts axial movement of the control mandrel 6 relative to the packer mandrel 36 when the lug 76 is in the position shown in FIG. 3. When the control mandrel is rotated relative to the packer mandrel, the lug 76 moves into the elongated portion of the J-slot and then is movable downwardly relative to the packer mandrel 36.

As shown in FIG. 15, a collet spring sleeve 78 is rigidly mounted on the interior surface of the mandrel 36. The collet spring sleeve 78 is generally cylindrical and has a plurality of longitudinal slots 80 which are uniformly spaced around the perimeter of the sleeve. The sleeve also has an internal rib 82 which includes upper and lower cam surfaces 83. The control mandrel 6 has a latch ring 84 secured thereon and in position to engage the rib 82 on the sleeve 78 upon axial movement of the control mandrel 6 relative to the packer mandrel 36. When the latch ring 84 engages the rib 82, the downward force of the control mandrel on the cam surface 83 causes the sleeve portions between the slots 80 to be displaced outwardly a sufficient distance to allow the latch ring 84 to pass across the rib 82. Preferably, the axial force required to displace the latch ring 84 across the rib 82 in either upward or downward direction is of the order of several thousand pounds, and is sufficiently great to provide a positive indication at the surface that the latch ring 84 has passed over the rib 82.

In the annular space between the control mandrel 6 and the packer mandrel 36, a free piston 86 is mounted, as shown in FIG. 13. The piston 86 has sealing rings on its outer and inner peripheral surfaces to prevent the leakage of fluid between the respective mandrels and the piston. The control mandrel 6 includes a shoulder 88, which is in position to limit downward axial movement of the piston 86 relative to the mandrel 6. A port 90 (FIG. 15) in the mandrel 6 communicates with the space between the control mandrel and the packer mandrel below the piston 86 and fluid flows through the port 90 into and out of the annular space between the piston and the sealing rings 92 adjacent the port 68. Fluid pressure from the exterior of the tool communicates through a port 94 in the packer mandrel with the annular space above the piston 86.

Figure 14:
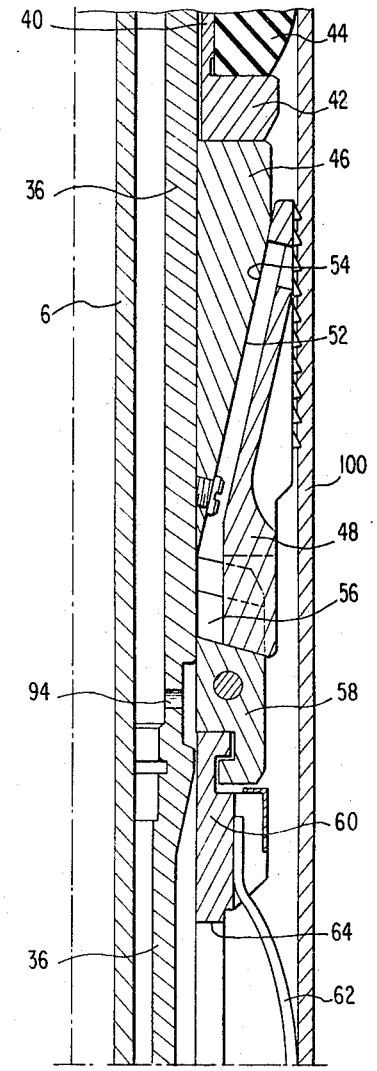
FIG. 14 is an enlarged cross sectional view of the portion of the bridge plug as in FIG. 13 after the bridge plug has been set in a well casing.

In operation, the retrievable bridge plug is attached at the lower end of a tubing string 98, as shown in FIGS. 5A and 5B. The tool is lowered in a well casing 100 to the desired depth. While the tool is being lowered in the casing, the drag springs 62 engage the inside surface of the casing and resist downward movement of the mandrel 6 relative to the casing. Therefore, the lug 8 is in the position shown in FIG. 6, and the elements of the retrievable bridge plug are in the respective positions shown in FIGS. 1A and 1B. When the desired depth is reached, the tubing string is rotated to the right to displace the lug 66 on the packer mandrel from the position shown in FIG. 4 to the position shown in FIG. 8. The weight of the tubing string is applied through the control mandrel lug 8 and through the lug 76 to the shoulder in the packer mandrel J-slot 74. The drag springs 62 resist downward movement of the drag spring sleeve 60 relative to the casing, and since the lower slips 48 are attached to the sleeve 60 by the slip retainer 58, the lower slips are held against downward movement. The lower mechanical slip body 46, however, moves downwardly with the packer mandrel 36 and this relative axial movement cams the lower slips 48 outwardly into engagement with the casing 100, as shown in FIGS. 5B and 14. When the lower slips 48 engage the casing, further downward movement of the lower mechanical slip body 46 is resisted by the slips 48. The packer sleeve 40 thus is held stationary against the body 46 as the packer mandrel 36 and the control mandrel 6 continue to move downwardly.

Right hand rotation of the tubing string 98 causes the lug 76 on the control mandrel to be displaced from the position shown in FIG. 3 to the position shown in FIG. 7. The control mandrel 6 moves downwardly relative to the packer mandrel 36, since the resisting force of the slips 48 is transmitted through the lower body 46 and through the packer rings 44 to the top shoe 38 which is secured to the upper end of the packer mandrel 36. This downward movement of the control mandrel relative to the packer mandrel 36 causes the latch ring 84 to pass over the collet spring rib 82, as shown in FIGS. 5B and 15. Since a force of several thousand pounds is required to push the latch ring through the collet spring, the operators at the surface of the well receive a positive indication that the tool is operating properly. Downward movement of the control mandrel 6 relative to the packer mandrel also causes the upper mandrel ports 72 and the lower ports 70 in the control mandrel to be closed as they pass over sealing rings in the interior of the junk catcher 10 and at the lower end of the packer mandrel 36, respectively.

The collar 18 on the control mandrel 6 engages the upper end of the spring 22, as shown in FIG. 10, and applies an axial force downwardly on the shoulder 15 of the upper slip retaining sleeve 14. After the spring 22 has been partially compressed, the lower end of the coupling 37 engages the upper end of the upper mechanical slip body 34 (FIG. 12), thereby displacing the top shoe 38 and the packer mandrel 36 downwardly to compress the packer rings 44 between the top shoe 38 and the flange 42 on the packer sleeve 40. The spring 22 imposes an axial force on the upper slip retaining sleeve 14 that is proportional to the deflection of the spring, while the weight of the tubing string that is applied to the control mandrel 6 is transmitted directly through the coupling 37 to the upper mechanical slip body 34 and the top shoe 38. The gripping segments 28 on the outer surface of the upper slips 26 are inclined in order to allow the slips to slide downwardly along the casing toward the packer rings.

It is desirable that a sufficient force be applied to the upper slip retaining sleeve 14 to cause the slips to be displaced downwardly with the upper mechanical slip body 34, but if the full weight of the tubing string is applied through the slips to the top shoe 38 as in conventional tools, a major proportion of the setting force will be lost through the frictional engagement of the slips with the casing. By dividing the downward force of the tubing string between the sleeve 14 and the upper mechanical slip body 34, only that proportion of the total setting weight that is required to displace the slips outwardly against the casing is applied to the sleeve 14. The remaining setting weight is applied directly to the lower mechanical slip body 34 where it is transmitted to the packer rings. When the packer rings have been expanded, the resilience of the rings 44 imposes an axial force on the upper and lower slips urging the slips to move away from the packer rings. The segments embedded in the face of the slips 26 and 48, however, resist axial movement of the slips away from the packer rings, and thus maintain the packer rings in an expanded condition.

The bridge plug is now set in the casing and the overshot 2 may be disconnected from the tool by raising and turning the string until the lug 8 on the control mandrel passes out of the open end of the J-slot 4. The tubing string may then be raised from the casing. While the overshot is being disconnected from the control mandrel 6, the collet spring 78 resists upward movement of the control mandrel. Therefore, the bypass ports 70 remain closed.

The bridge plug takes advantage of the fluid pressure differential across the packer rings 44 to maintain the packer rings in an expanded condition. If the pressure below the packer rings 44 is greater than the pressure above the packer rings, the pressure is applied to the piston sleeve 40 which applies an axial force to the packer rings through the flange 42. If the pressure above the packer rings 44 is greater than below the packer rings, the pressure is applied to the packer mandrel 36 which transmits the force to the packer rings through the top shoe 38.

Figure 16:
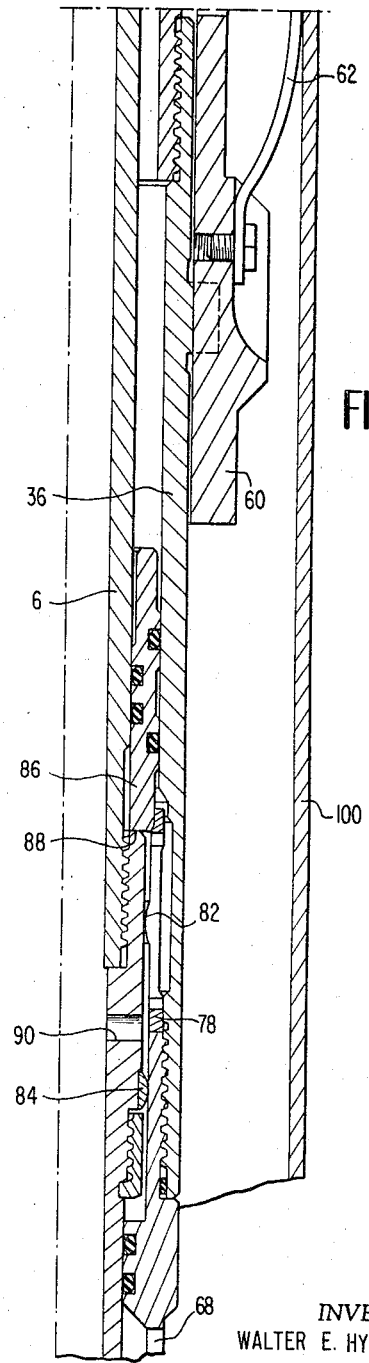
FIG. 16 is an enlarged cross sectional view of the lower portion of the bridge plug as in FIG. 15 after the bridge plug has been set in a well casing.

The bridge plug also takes advantage of the fluid pressure differential across the control mandrel 6 to keep it in the downward or set position, thereby eliminating the need for a positive mechanical lock requiring rotation to release. When pressure below the bridge plug is acting upward across the bottom of control mandrel 6, this pressure is also acting downward on the control mandrel by the action of pressure against the piston 86. The area of the piston 86 is greater than the area of the control mandrel 6 exposed to pressure differential so the net resulting force keeps the mandrel down. When pressure from above the bridge plug is acting upward on the piston 86, the piston 86 is displaced upwardly away from the shoulder 88 (FIG. 16) and therefore does not impose an axial force on the control mandrel. This results in a downward force on the control mandrel 6 caused by pressure from above the packer rings acting across the bottom of the control mandrel.

In addition, the fluid pressure acting on the lower surface of the flange 42 tends to displace the sleeve 40 upwardly, thereby squeezing the packer rings 44 more tightly against the casing. If the fluid pressure above the packer rings 44 is greater than the pressure below the packer rings, the pressure differential acting on the exposed upper and lower ends of the control mandrel 6 urges the control mandrel downwardly. Thus, the packer rings are urged tightly against the casing by the fluid pressure differential across the rings 44, regardless of whether the higher pressure exists above or below the rings 44. If the fluid pressure above and below the packer rings 44 is approximately equal, the packer rings are secured in their expanded condition by the slips 26 and 48 which bite into the casing.

In order to retrieve the tool, the tubing string with the overshot 2 at the lower end is run in the casing and the lug 8 enters the open end of the J-slot 4 until it is lodged in the position shown in FIG. 6. By pulling up on the tubing, the lug 8 is displaced to the position shown in dotted lines in FIG. 2, and the upward force is transmitted to the control mandrel 6, thereby displacing the coupling 37 upwardly relative to the body 34 and displacing the collar 18 upwardly, thereby releasing the spring 22. The upper slips are then retracted by engagement of the upper end of the collar 18 with the shoulder 16 on the sleeve 14, which imparts upward movement to the slip retaining sleeve. The sloping T-slots in the sleeve 14 cooperate with the T-slots 36 in the body 34 to draw the upper slips inwardly relative to the casing.

As the control mandrel moves upwardly relative to the packer mandrel, the latch ring 84 passes over the rib 82 of the collet spring, and this motion imparts a jarring action to the packer mandrel to work the packer ring sleeve or other element loose, if they should become stuck. The lug 76 on the control mandrel 6 is displaced into the position shown in FIG. 3 by lifting the control mandrel 6. This causes the packer mandrel to be displaced upwardly relative to the drag spring sleeve 60 until the packer mandrel lug 66 is lodged at the upper end of the J-slot 64, as shown in FIG. 4. The tool can then be raised from the casing or displaced to another depth relative to the casing.

One advantage of the retrievable bridge plug of this invention is that the tubing weight may be fully utilized in setting the packer rings because only a small portion of the weight is applied to the upper slips. The bridge plug of this invention also utilizes the hydraulic pressure across the packer rings to maintain an axial force on the packer rings regardless of whether the pressure is higher above or below the packer rings. Since the collet spring holds the control mandrel down even when the pressure differential across the packer rings is small, there is no need for a holddown J-slot for the control mandrel. Such a hold-down J-slot is undesirable because left hand rotation of the casing string would be required to operate the J-slot. Furthermore, the collet spring and latch ring arrangement prevents premature setting of the tool by running the tubing string in a well, since the characteristic "jump" provides an indication of the relative axial positions of the control mandrel and the packer mandrel. The collet spring also provides a jar to help unseat the packer from the casing. The control J-slot 74 is located at a position where accidental thread back-off is minimized and therefore set screws and thread locks are not required on the tool. Another advantage is that the tubing string is rotated only to the right while setting, but no rotation is required while retrieving the bridge plug.

While this invention has been illustrated and described in one embodiment, it is recognized that variations and changes may be made therein without departing from the invention as set forth in the claims.

We claim:

1. In a retrievable bridge plug of the type having a packer element mounted coaxially on a packer mandrel, a control mandrel telescoped within said packer mandrel, means at one end of said packer element for engaging a well casing and resisting relative movement of said packer element in one direction relative to the well casing, a packer shoe at the opposite end of said packer element, said packer shoe being movable toward said casing engaging means for axially compressing said packer element therebetween, a slip control sleeve mounted coaxially on said mandrel, a plurality of slips connected between said packer shoe and said control sleeve, cam means between said slips and said shoe for displacing said slips outwardly into engagement with the well casing upon movement of said control sleeve axially toward said packer element, and shoulder means on said control mandrel in position for imparting a force on said slips in the direction of said packer element, the improvement comprising:

said control sleeve including an abutment adjacent said control mandrel, spring means interposed between said control sleeve abutment and said shoulder means, and second shoulder means on said control mandrel, said packer shoe including an abutment in position for engagement by said second shoulder means for imparting a force on said shoe in the direction of said packer element, said second shoulder means being spaced axially from said shoe abutment a greater distance than said first mentioned shoulder means is spaced from said spring means, whereby upon axial movement of said mandrel the first shoulder means begins compressing said spring means and a portion of the axial force on the control mandrel is transmitted through the spring means for setting the slips before said second shoulder means on the control mandrel engages the packer shoe abutment for expanding the packer element.

2. The retrievable bridge plug according to claim 1 wherein said spring means is in the form of a coil spring extending longitudinally of said control mandrel.

3. The retrievable bridge plug according to claim 1 wherein said packer mandrel and said control mandrel include a latch collar on one of said mandrels and a latch ring on the other of said mandrels, whereby longitudinal movement of said control mandrel relative to said packer mandrel may be sensed at the well head.

4. In a retrievable bridge plug of the type having a packer element mounted coaxially on a packer mandrel, a control mandrel telescoped within said packer mandrel, means at one end of said packer element for engaging a well casing and resisting relative movement of said packer element in one direction relative to the well casing, a packer shoe at the opposite end of said packer element, said packer shoe being movable toward said casing engaging means for axially compressing said packer element therebetween, slips connected with said packer shoe, cam means between said slips and said shoe for displacing said slips outwardly into engagement with the well casing upon movement of said slips toward said packer element, and shoulder means on said control mandrel in position for imparting a force on said slips in the direction of said packer element, the improvement comprising:

spring means interposed between said slips and said shoulder means, second shoulder means on said control mandrel in position for imparting a force on said shoe in the direction of said packer element, said slips being retained at one end in inclined T-slots in said packer shoe and being retained at the opposite end in T-slots in a sleeve, said sleeve being mounted coaxially on said control mandrel, said sleeve including an abutment adjacent said control mandrel, and said spring having one end in engagement with said abutment and the opposite end in position to be engaged by said first shoulder means, whereby a portion of the force on the control mandrel is transmitted through the spring means for setting the slips and the remainder of the force on the control mandrel is applied to the packer shoe for expanding the packer element.

5. The retrievable bridge plug according to claim 4 wherein said first and second shoulder means are spaced apart a sufficient distance to allow partial compression of said spring by said first shoulder means when said second shoulder means engages said shoe upon axial movement of said control mandrel.

6. The retrievable bridge plug according to claim 4 wherein said slips include a plurality of segments in position to engage the well casing, said segments having gripping surfaces inclined with respect to the axis of said control mandrel to bite into said casing upon movement away from said packer element and to slide along said casing upon movement toward said element.

7. In a retrievable bridge plug of the type having a packer element mounted coaxially on a packer mandrel, a control mandrel telescoped within said packer mandrel, means at one end of said packer element for engaging a well casing and resisting relative movement of said packer element in one direction relative the well casing, a packer shoe at the opposite end of said packer element, said packer shoe being movable toward said casing engaging means for axially compressing said packer element therebetween, slips connected with said packer shoe, cam means between said slips and said shoe for displacing said slips outwardly into engagement with the well casing upon movement of said slips toward said packer element, and shoulder means on said control mandrel in position for imparting a force on said slips in the direction of said packer element, the improvement comprising:

means forming a fluid chamber between said packer mandrel and said control mandrel, passage means providing communication between said chamber means and the exterior of said packer mandrel at said one end of said packer element, and a fluid responsive means in said chamber for urging said control mandrel in said one direction, whereby the fluid pressure differential across the packer element acts to maintain the packer element in sealing relation with the casing.

8. The retrievable bridge plug according to claim 7 including J-slot means between said control and packer mandrels for selectively limiting relative movement therebetween, a latch collar on one of said mandrels and a latch ring on the other of said mandrels, said latch collar and latch ring being spaced from each other when said mandrels are locked together by said J-slot means and in engagement with each other when said J-slot means is oriented for relative axial movement, whereby a positive indication of the operation of the J-slot is provided.

9. The retrievable bridge plug according to claim 7 wherein said packer element is mounted on a sleeve, said sleeve having a radial flange at said one end of said packer element, said sleeve extending in telescoping relation with said packer shoe, whereby fluid pressure on said flange cooperates with said fluid responsive means to maintain said packer element in sealing relation with the casing.

10. The retrievable bridge plug according to claim 7 wherein said fluid responsive means includes a free piston in said chamber packer mandrel and abutment means on said control mandrel, said abutment means being in position to limit axial movement of said piston relative to said control mandrel, whereby fluid pressure on the outside of the packer mandrel urges the piston against the abutment means to impart a force to the control mandrel in response to the fluid pressure differential across the packer element.

11. The retrievable bridge plug according to claim 10 wherein said passage means is spaced in said chamber axially from said abutment means, said piston being positioned between said passage means and said abutment, said control mandrel having a conduit therein, said conduit communicating at one end with said chamber on the opposite side of said piston from said passage means, the opposite end of said conduit communicating with the exterior of said mandrel at the opposite end of said packer element.

12. The retrievable bridge plug acording to claim 10 wherein said control mandrel includes a conduit extending axially therethrough, first ports in said control mandrel positioned at one end of said packer element and second ports at the opposite end of said packer element, and valve means connected with said packer element for closing one of said ports upon axial movement of said control mandrel in said one direction.

13. The retrievable bridge plug according to claim 10 wherein said control mandrel includes fluid pressure responsive surfaces at opposite ends of said packer element, said piston and abutment means cooperating to urge said control mandrel only in said one direction in response to a fluid pressure differential between said surfaces.

14. The retrievable bridge plug according to claim 10 wherein said abutment means is arranged in opposed relation to said shoulder means, whereby upon engagement of said piston with said abutment means, said piston urges said control shoulder means toward said slips in the direction of said packer element.

15. The retrievable bridge plug according to claim 14 including spring means interposed between said slips and said shoulder means, and second shoulder means on said control mandrel in position for imparting a force on said shoe in the direction of said packer element.

16. The retrievable bridge plug according to claim 15 wherein said first and second shoulder means extend substantially radially outward from said control mandrel and facing toward said one direction, said abutment means including a shoulder facing toward the opposite direction.

References Cited
UNITED STATES PATENTS

| | | | |
|---|---|---|---|
| 3,288,219 | 11/1966 | Young et al. | 166—120 |
| 3,308,886 | 3/1967 | Evans | 166—134 |
| 3,338,308 | 8/1967 | Elliston et al. | 166—134 X |
| 3,339,637 | 9/1967 | Holden | 166—134 X |
| 3,356,142 | 12/1967 | Crow et al. | 166—134 |
| 3,361,207 | 1/1968 | Chenoweth | 166—120 |

DAVID H. BROWN, *Primary Examiner.*

U.S. Cl. X.R.

166—134, 137